United States Patent
Tanaka

[19]

[11] Patent Number: 5,845,137
[45] Date of Patent: Dec. 1, 1998

[54] METHOD AND APPARATUS FOR SETTING THE REDUCED POWER MODE OF A PROCESSING SYSTEM IN ACCORDANCE WITH THE TYPE OF PERIPHERALS CONNECTED TO THE PROCESSING SYSTEM

[75] Inventor: Nobuyoshi Tanaka, Tokyo, Japan

[73] Assignee: Canon Kabushiki Kaisha, Tokyo, Japan

[21] Appl. No.: 605,679

[22] Filed: Feb. 22, 1996

[30] Foreign Application Priority Data

Feb. 22, 1995  [JP]  Japan .................................. 7-058000

[51] Int. Cl.⁶ ..................................................... G06F 1/32
[52] U.S. Cl. ................ 395/750.05; 395/750.03; 364/707
[58] Field of Search .................... 395/750, 281–284, 395/828, 834; 364/707

[56] References Cited

U.S. PATENT DOCUMENTS

| | | | |
|---|---|---|---|
| 5,167,024 | 11/1992 | Smith et al. ............................. | 395/750 |
| 5,230,074 | 7/1993 | Canova, Jr. et al. ..................... | 395/750 |
| 5,404,543 | 4/1995 | Faucher et al. .......................... | 395/750 |
| 5,410,713 | 4/1995 | White et al. ............................. | 395/750 |
| 5,423,045 | 6/1995 | Kannan et al. .......................... | 395/750 |
| 5,446,904 | 8/1995 | Belt et al. ................................ | 395/750 |
| 5,483,656 | 1/1996 | Oprescu et al. ......................... | 395/750 |
| 5,530,879 | 6/1996 | Crump et al. ............................ | 395/750 |
| 5,596,628 | 1/1997 | Klein ........................................ | 379/93 |
| 5,600,841 | 2/1997 | Culbert .................................... | 395/750 |
| 5,617,572 | 4/1997 | Pearce et al. ............................ | 395/750 |

*Primary Examiner*—Meng-Ai T. An
*Assistant Examiner*—Sumati Lefkowitz
*Attorney, Agent, or Firm*—Fitzpatrick, Cella, Harper & Scinto

[57] ABSTRACT

An information processing system that can return to an operational state at any time as a result of an event input from a peripheral device which is constructed by an information processing system main body and a peripheral device and has a power management function having a plurality of suspension modes is constructed by a connection state detection unit for detecting whether a predetermined peripheral device is connected to the information processing system main body or not, an event detection unit for detecting an event to instruct the start of an operation of the predetermined peripheral device, and a mode setting unit for setting the system into a mode among the plurality of suspension modes in which the peripheral device can be resumed from a suspension state to an operation state when it is detected by the event detection unit that the event is detected in the case where it is detected by the connection state detection unit that the predetermined peripheral device is connected.

14 Claims, 13 Drawing Sheets

METHOD AND APPARATUS FOR SETTING THE REDUCED POWER MODE OF A PROCESSING SYSTEM IN ACCORDANCE WITH THE TYPE OF PERIPHERALS CONNECTED TO THE PROCESSING SYSTEM

BACKGROUND OF THE INVENTION

1. Field of the Invention

The invention relates to an information processing system which is constructed by an information processing system main body and peripheral devices and has a power management function for enabling the system to be shifted to a suspension state.

2. Related Background Art

In a conventional information processing system such as personal computer, word processor, or the like having what is called a power management function (suspension/resumption function), in the case where no operation is performed in an ON state of a power source, the user operates a suspension/resumption change-over switch or the like, thereby shifting the system to a suspension state in order to save an electric power consumption.

In the suspension state, the system is held in an interruption state and an electric power is supplied to only partial devices in the system main body in order to enable the system to be returned to an operation state.

In the information processing system having the power management function as mentioned above, a resuming operation to return from the suspension state to the operation state is started and executed by an operation of the suspension/resumption change-over switch or a predetermined resumption event input (a key input of a character key or the like associated with the information processing system or an event input such as a call signal or the like which is inputted from a telephone line in the case where a modem card is used by a peripheral device such as a PC card device or the like connected to the information processing system).

Namely, in such a type of information processing system, there are a plurality of modes in the suspension state. For example, the system has a plurality of suspension modes such as "normal suspension mode", "special suspension mode", and the like. Namely, in the normal suspension mode, although a supply amount of an electric power to the information processing system has been reduced, when the information processing system detects the resumption event, the system is immediately returned (resumed) to the operation state. In the special suspension mode, a supply amount of the electric power to the information processing system is minimum and in order to resume the system, it is necessary to perform the operation of the suspension/resumption change-over switch. When the system is shifted to the suspension state, the user can select any one of the above suspension modes by setting.

In the case where peripheral devices such as CRT display, printer, and the like having likewise the power management function are connected to the above conventional information processing system having the power management function, the peripheral device detects that the information processing system main body has entered the suspension state, so that the peripheral device is shifted to the suspension state.

In such a type of information processing system having the peripheral devices, in order to resume the information processing system in the suspension state, the user needs to resume the system by operating the suspension/resumption change-over switch provided for the information processing system main body or by another method.

Further, in an information processing system such as a notebook type personal computer or the like which has an LID switch to detect the opening or closure of a lid and which can be shifted to the suspension state when the LID switch detects the closure of the lid, only either one of a mode such that "a suspension is performed" and a mode such that "no suspension is performed" can be selected when setting an environment regarding the suspending process. When the environment of "a suspension is performed" is set, by detecting that the lid is closed, the system is unconditionally shifted to the suspension state irrespective of a connecting situation of an external module.

In the above conventional information processing system having a plurality of suspension modes, when a modem card is used as a PC card, so long as the suspension mode is set to the "special suspension mode", even if a call signal is inputted from the telephone line, the information processing system is not resumed. Therefore, there is an inconvenience such that a communication cannot be performed or the like.

In the case where the peripheral devices such as CRT display, printer, and the like having the power management function are connected to the above conventional information processing system, in order to resume the information processing system in the suspension state, it is necessary to operate the suspension/resumption change-over switch provided for the information processing system main body. Therefore, in the case where it is difficult to operate the suspension/resumption change-over switch as in a case where, for example, the lid of the information processing system such as a notebook type personal computer or the like is closed, there is a problem such that the operation to resume the information processing system is troublesome or the like.

Moreover, in the above conventional information processing system having the LID switch, in the case where the external modules such as CRT display, keyboard, and the like are connected to the information processing system and are used, so long as the suspension environment is set to "a suspension is performed", the information processing system cannot be used in a closed state of the lid, so that there is an inconvenience such that the suspension environment setting has to be changed in accordance with a connecting situation or the like of the external modules.

SUMMARY OF THE INVENTION

It is an object of the invention to provide an information processing system which can be returned to an operation state any time by an event input in the case where a peripheral device which always has a necessity to return from a suspension state to an operation state is connected and used.

Another object of the invention is to provide an information processing system which detects a switching operation of a connected peripheral device and can be return from a suspension state to an operation state.

Still another object of the invention is to provide an information processing system in which the setting of a judgment regarding whether the system is shifted to a suspension state when a lid of the information processing system is closed or not can be automatically switched in accordance with a connecting situation and an operating situation of an external module.

According to the invention, there is provided an information processing system which is constructed by an information processing system main body and a peripheral device and has a power management function for enabling the system to be shifted to a suspension state of a plurality of modes, comprising: connecting situation detecting means for detecting a connecting situation of a predetermined peripheral device to the information processing system main body; event detecting means for detecting an event when the predetermined peripheral device enters an operation state; and mode setting means for setting in a manner such that when the connection of the predetermined peripheral device is detected by the connecting situation detecting means, the mode of the suspension state is set to the mode such that the system can be returned from the suspension state to the operation state when the event is inputted.

According to the invention, there is provided an information processing system which is constructed by an information processing system main body and a peripheral device and has resuming means for performing a resuming operation to return the system from a suspension state to an operation state, comprising: detecting means for detecting an operating situation of a switch of the peripheral device connected to the information processing system main body; and instructing means for instructing the start of the resuming operation to the resuming means when the detecting means detects the operation of the switch of the peripheral device.

Further, according to the invention, there is provided an information processing system which is constructed by an information processing system main body and a peripheral device and has a switch to detect an opening or closure of a lid and shift means for shifting the system to a suspension state when the switch detects that the lid is closed, comprising: detecting means for detecting a connecting situation of the peripheral device to the information processing system main body and an operating situation of the peripheral device connected; judging means for judging whether the system should be shifted to the suspension state or not on the basis of the connecting situation and operating situation of the peripheral device which were detected by the detecting means when the switch detects that the lid is closed; and inhibiting means for inhibiting that the shift means shifts the system to the suspension state when the judging means judges that it is improper to shift the system to the suspension state.

DETAILED DESCRIPTION OF THE PREFERRED EMBODIMENTS

Embodiments of the invention will now be described in detail hereinbelow with reference to the drawings.

Figure 1:
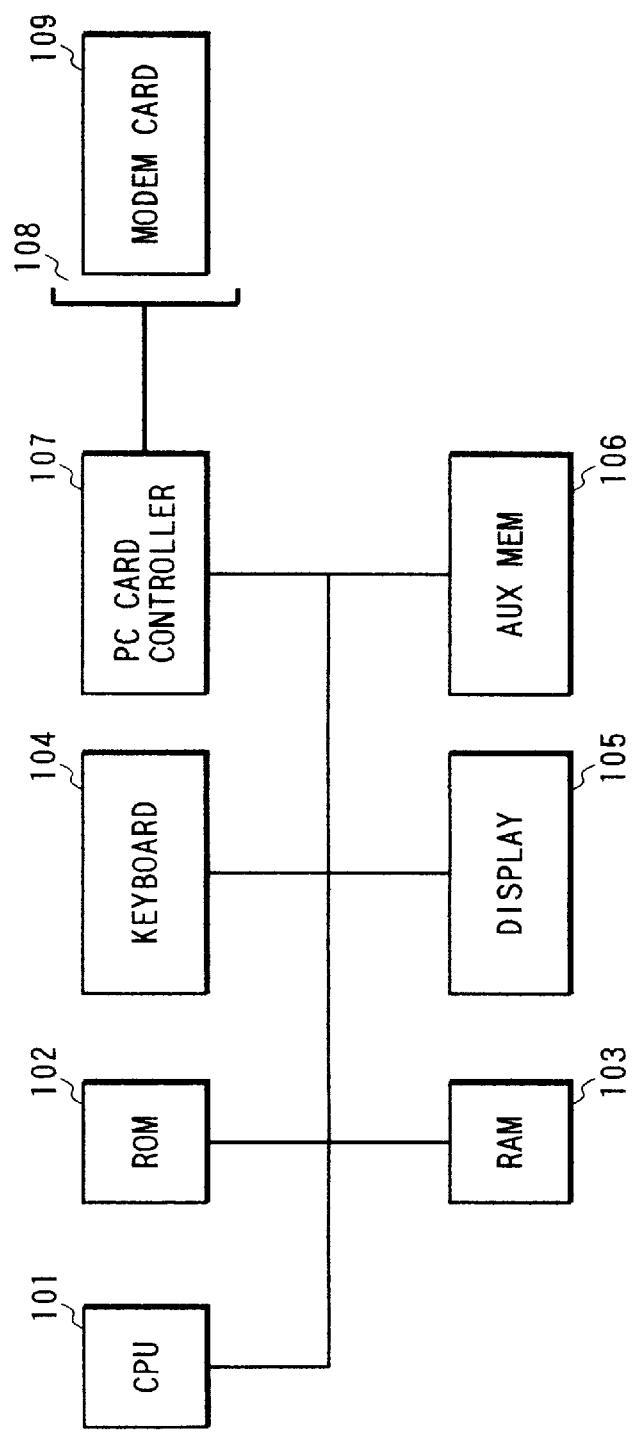
FIG. 1 is a block diagram showing a schematic construction of an information processing system according to the first embodiment of the invention.

FIG. 1 is a block diagram showing a schematic construction of a hardware system of an information processing system according to the first embodiment of the invention. The information processing system of the embodiment has a personal computer having a power management function as an information processing system. When the operation is interrupted during the use of the system, the system is shifted to a suspension state for holding the operation of the system in an interrupted state and preparing for the restart of the use for the purpose of an electric power saving or the like. The information processing system has a PC card device as a peripheral device which can be connected to the information processing system and should be automatically returned to the operation state in accordance with an external event in a suspension state. The information processing system can be connected to a telephone line by using a modem card as a PC card.

In the suspension state to which the information processing system is shifted, a normal suspension mode and a special suspension mode are provided. In the normal suspension mode, although a supply amount of an electric power to the system is reduced, in the case where an event is generated due to the operation or a keyboard, a mouse, or the like or a modem card is used by the PC card device, the system is returned (hereinafter, referred to as "resumed") to the operation state by an input of an external event such as a call signal or the like that is inputted from the telephone line. In the special suspension mode, the supply amount of the electric power is minimum and it is necessary to depress a suspension/resumption change-over switch provided for the information processing system in order to resume the system.

As shown in FIG. 1, the information processing system is constructed by: a CPU (central processing unit) 101; an ROM (read only memory) 102; an RAM (random access memory) 103; a keyboard 104; a display 105; an auxiliary (AUX) memory 106; a PC card controller 107; and a PC card slot 108. A modem card 109 as a PC card can be attached to the PC card slot 108.

The CPU 101 controls the information processing system and executes a program for various processes. The ROM 102 stores a program which is executed by the CPU 101. The RAM 103 is used as a work area when the CPU 101 executes the program. The keyboard 104 is used to input various information such as information regarding the operation, character information, and the like. The display 105 displays the various information. The AUX memory 106 (HDD or FDD) stores programs or various data and information is read out or written from/into the AUX memory 106 as necessary. The PC card controller 107 controls the PC card device. Various PC cards such as a modem card and the like are attached to the PC card slot 108.

Figure 2:
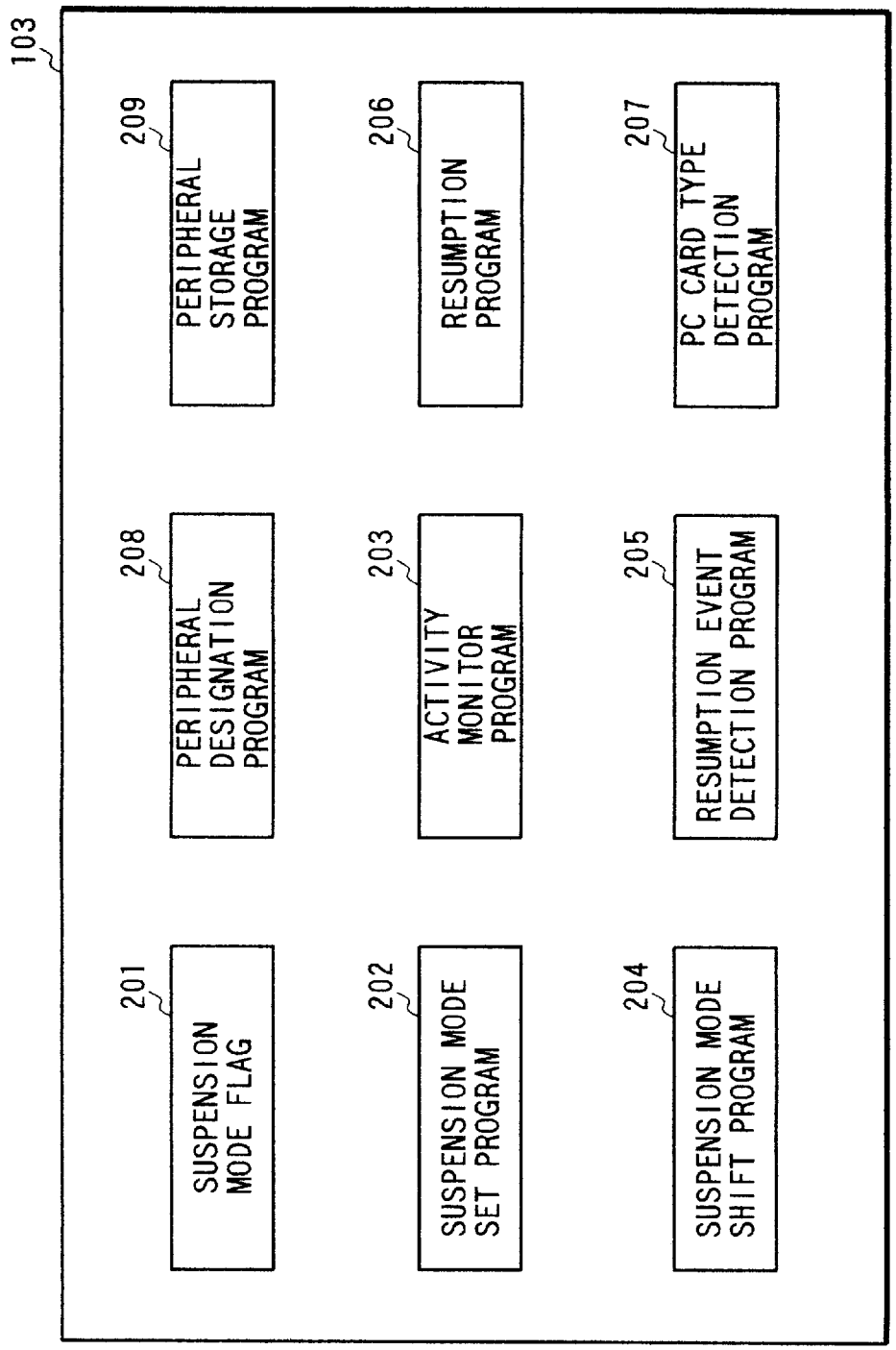
FIG. 2 is a block diagram showing a schematic construction of a program system of the information processing system.

A software system of the information processing system will now be described with reference to FIG. 2. FIG. 2 is a block diagram showing a construction of the program stored in the RAM 103.

As shown in the diagram, the software system of the information processing system is constructed by: a suspension mode flag 201; a suspension mode set program 202; an activity monitor program 203; a suspension mode shift program 204; a resumption event detection program 205; a resumption program 206; a PC card type detection program 207; a peripheral designation program 208; a peripheral storage program 209; and the like.

The suspension mode flag 201 stores the mode designated by the user among three modes: 1) a mode in which the system is not shifted to the suspension state; 2) a mode in which the system is shifted to the normal suspension mode; and 3) a mode in which the system is shifted to the special suspension mode. The CPU 101 executes the suspension mode set program 202, thereby setting any one of the above three modes by the designation by the user.

When setting the suspension mode by executing the suspension mode set program 202, the CPU 101 displays a selection menu of the suspension modes onto the display 105 in FIG. 1 and selects a desired one of the selection items displayed by the keyboard 104, a mouse (not shown), or the like.

The CPU 101 monitors an operating situation of the system by executing the activity monitor program 203, thereby judging whether the system is at present executing a useful work or not. This judgment is performed by monitoring whether a key input has been performed or not or whether an access has been performed to the AUX memory 106 in FIG. 1 or not. When there is no key input or the access is not performed to the AUX memory 106 for a predetermined time, it is judged that the system is not performing any useful work at present.

When it is judged that the system is not performing the useful work at present by executing the activity monitor program 203, by executing the suspension mode shift program 204, the CPU 101 executes a control of a hardware system to shift to the suspension state set in the suspension mode flag 201. By executing the resumption event detection program 205, in the suspension state of the system, the CPU 101 detects an event to resume the system such as key input by the keyboard 104, signal input from a serial port, switch input by the suspension/resumption change-over switch, or the like.

By executing the resumption program 206, the CPU 101 executes a control of the hardware system to resume the system. By executing the PC card type detection program 207, the CPU 101 judges the type of PC card inserted into the PC card slot 108 in FIG. 1 with reference to the information stored in the PC card. Whether the inserted PC card is a modem card or not is judged by a function ID tupple and a function expansion tupple in case of a card corresponding to Release 2.1 of the PCMCIA standard. With respect to a card which doesn't correspond to the above standard, although the judgment is incomplete, the above judgment is performed by discriminating whether a usable I/O address is used by the modem card or not.

By executing the peripheral designation program 208, in the suspension state of the system, the CPU 101 designates a peripheral device which should be always resumed from the suspension state to the operation state by an external event input. By executing the peripheral storage program 209, the CPU 101 stores the peripheral device designated by the peripheral designation program 208.

The operation of the system of the embodiment will now be specifically described with reference to FIGS. 3 to 5 together with FIGS. 1 and 2.

Figure 3:
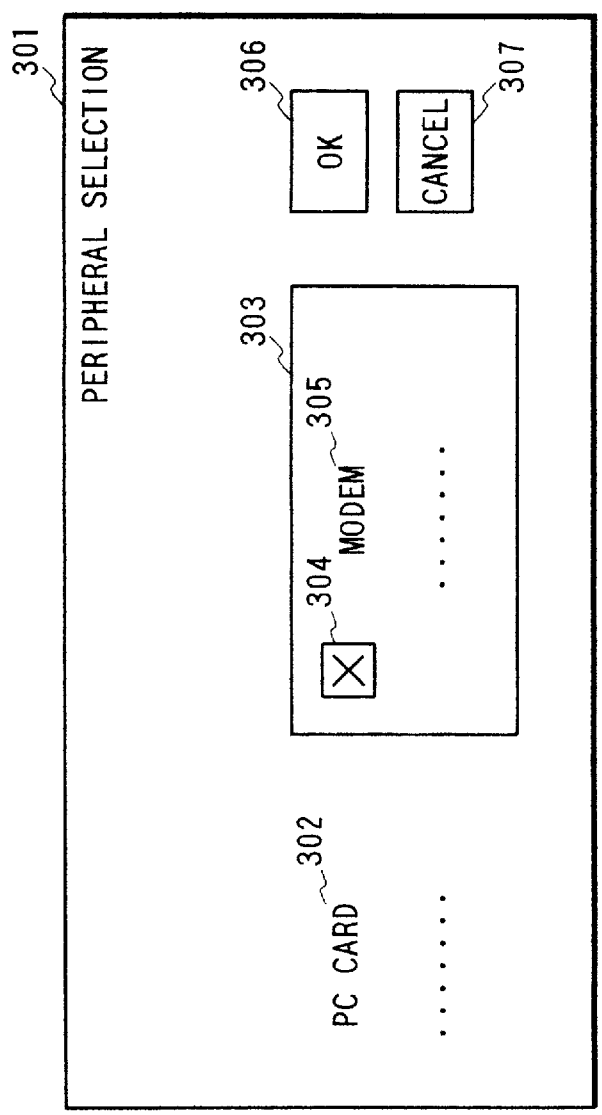
FIG. 3 is an explanatory diagram showing a display example on a display device of the information processing system.

FIG. 3 is a diagram showing a peripheral selection menu which is displayed on the display 106 in the case where by executing the peripheral designation program 208, the CPU 101 designates the periphery to be automatically resumed to the operation state by an external event in the suspension state.

In the diagram, reference numeral 301 denotes a peripheral selection menu display screen on the display 106. Reference numeral 302 denotes a selection item of the peripheral device which can be designated by executing the peripheral designation program 208. In this example, only the PC card device is displayed.

Reference numeral 303 denotes an area in which the selection item of the PC card which can be designated is displayed. In this example, only "modem" is displayed as a selection item 305 of the PC card. When there are any other PC cards which can be selected are added here and displayed.

The user executes a selecting operation of the selection items 302 and 305 by the keyboard 104, a mouse (not shown), or the like.

Reference numeral 304 denotes a box in which a mark "x" is displayed in order to show the selection of the item in the case where the selection item 305 was selected. Reference numeral 306 denotes an OK button to decide the designation on the picture plane displayed. When the OK button 306 is selected by the mouse or the like, the designation is decided and stored into the peripheral storage program 209. Reference numeral 307 denotes a cancel button to ignore the designation on the picture plane displayed.

Figure 4:
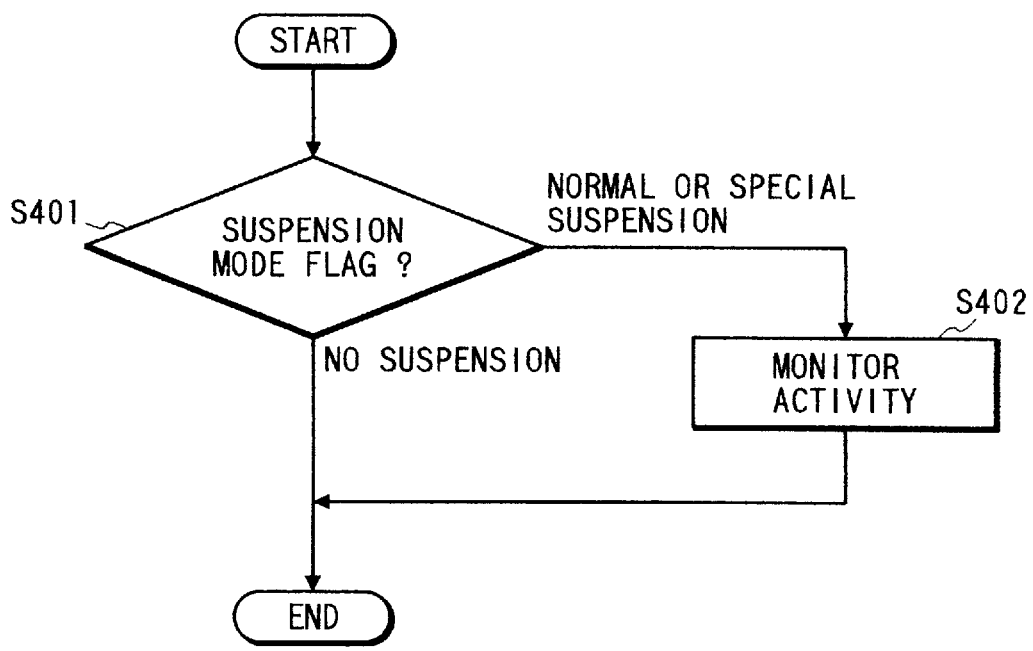
FIG. 4 is a flowchart showing processes which are executed by a control system of the information processing system.

FIG. 4 is a flowchart showing that the operation of the system is changed in accordance with the setting in the suspension mode flag 201.

First in step S401, when the setting of the suspension mode flag 201 is changed at the time of the activation of the system or by the change of the designation of the suspension mode, the setting of the suspension mode flag 201 is discriminated. When the flag 201 has been set to "no suspension is performed" mode, the processing routine is finished. When the flag 201 has been set to either one of "normal suspension is performed" and "special suspension is performed", the processing routine advances to step S402. An activity monitoring process is executed by the activity monitor program 203 (step S402).

Figure 5:
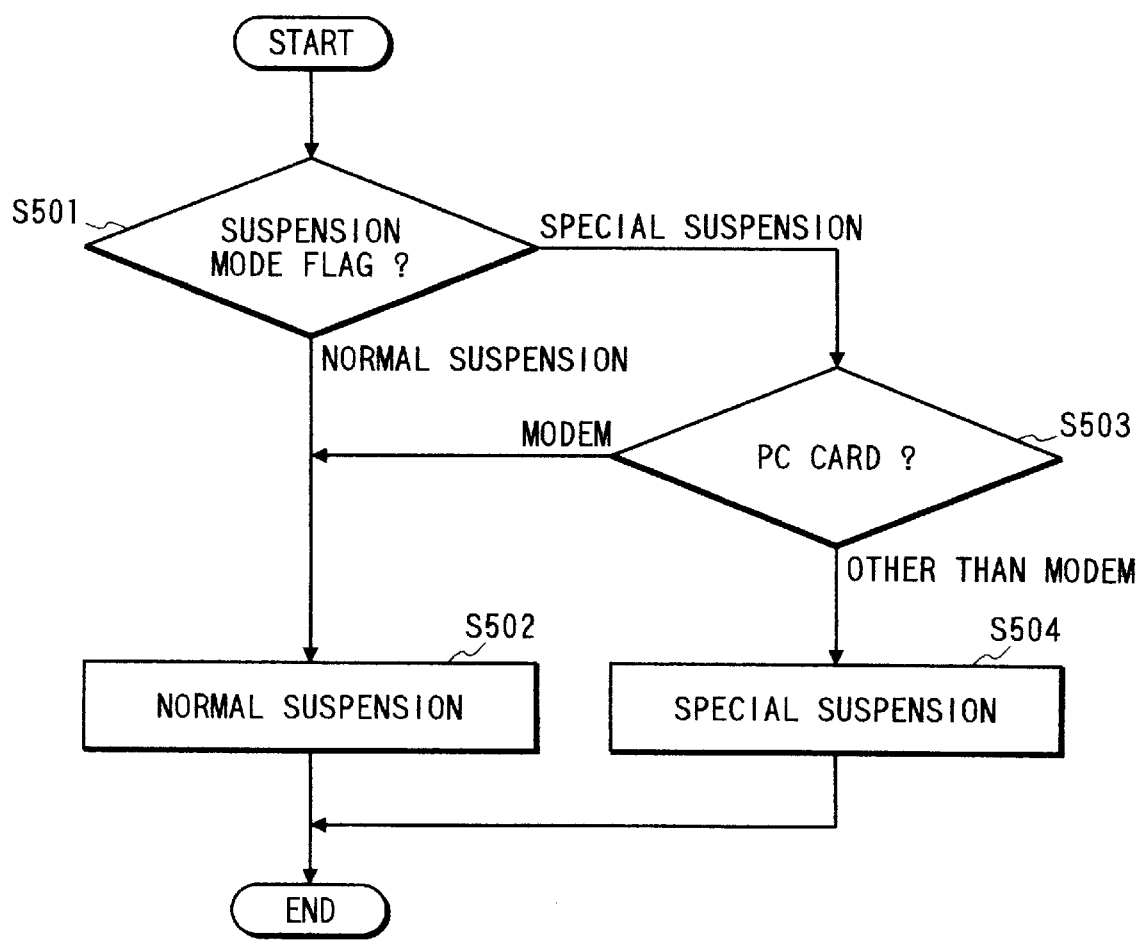
FIG. 5 is a flowchart showing processes which are executed by the control system of the information processing system.

FIG. 5 is a flowchart showing processes in the case where it is judged that the system can enter the suspension state by the activity monitor program 203 in the activity monitoring process that is executed in step S402 in FIG. 4.

In the activity monitoring process, when it is judged that the system can enter the suspension state by the activity monitor program 203 and when the system is shifted to the suspension state, in step S501, the suspension mode flag is judged. When the suspension mode flag has been set to "normal suspension is performed", step S502 follows. The system is shifted to the normal suspension mode by the suspension mode shift program 204. The processing routine is finished.

In step S501, when the suspension mode flag is set to "special suspension is performed", step S503 follows. The type of PC card inserted into the PC card slot 108 is discriminated by the PC card type detection program 207. When a PC card other than the modem card is inserted, step S504 follows and the system is shifted to the special suspension mode. The processing routine is finished. When the PC card inserted is the modem card, step S502 follows and the system is shifted to the normal suspension mode. The processing routine is finished.

As described in detail above, according to the information processing system of the embodiment, the PC card device and the modem card are selected by the peripheral selection menu. When the insertion of the modem card into the PC card slot 108 is detected, even if the system is erroneously set so as to be shifted to the special suspension mode, when the system is shifted to the suspension state, the system is shifted to the normal suspension mode. Therefore, the system is resumed to the operation state by the call signal from the telephone line and the user can continue the operation of the system.

In the above embodiment, since the peripheral device which can be selected has been set to only the PC card device, the type of PC card is immediately discriminated after the execution of the discrimination of the suspension mode flag. In the case where there are a plurality of peripheral devices which can be selected, however, after the suspension mode flag was checked, a process to discriminate whether the selected peripheral device has been connected or not is performed.

In the embodiment, the peripheral device to be resumed to the operation state by the external event has been designated by the peripheral designation program 208. However, it is also possible to construct in a manner such that the peripheral device to be resumed to the operation state by the external event is fixed by the system and stored in the peripheral storage program 209.

The second embodiment of the invention will now be described with reference to FIGS. 6 and 7.

Figure 6:
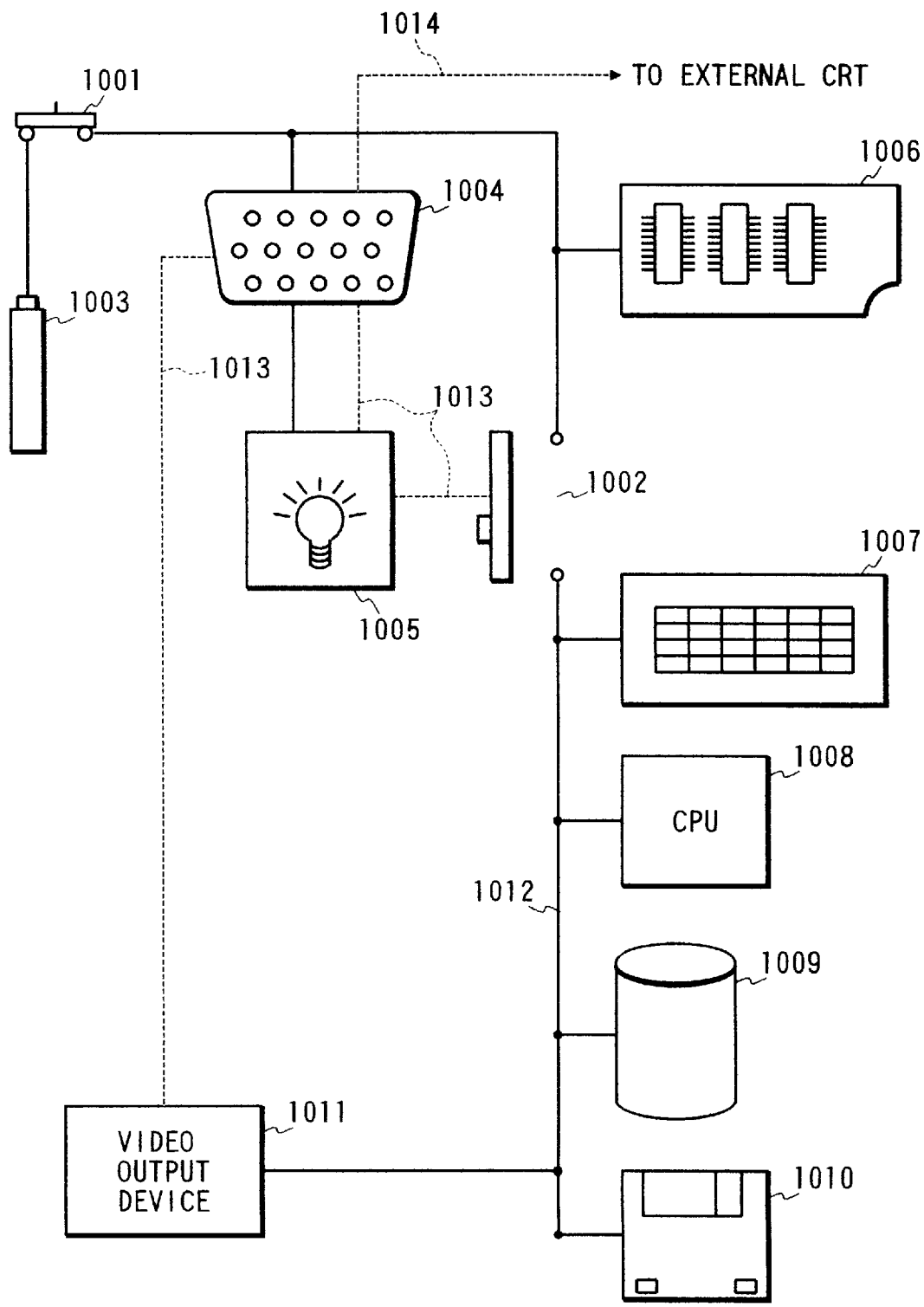
FIG. 6 is a block diagram showing a schematic construction of an information processing system according to the second embodiment of the invention.
Figure 7:
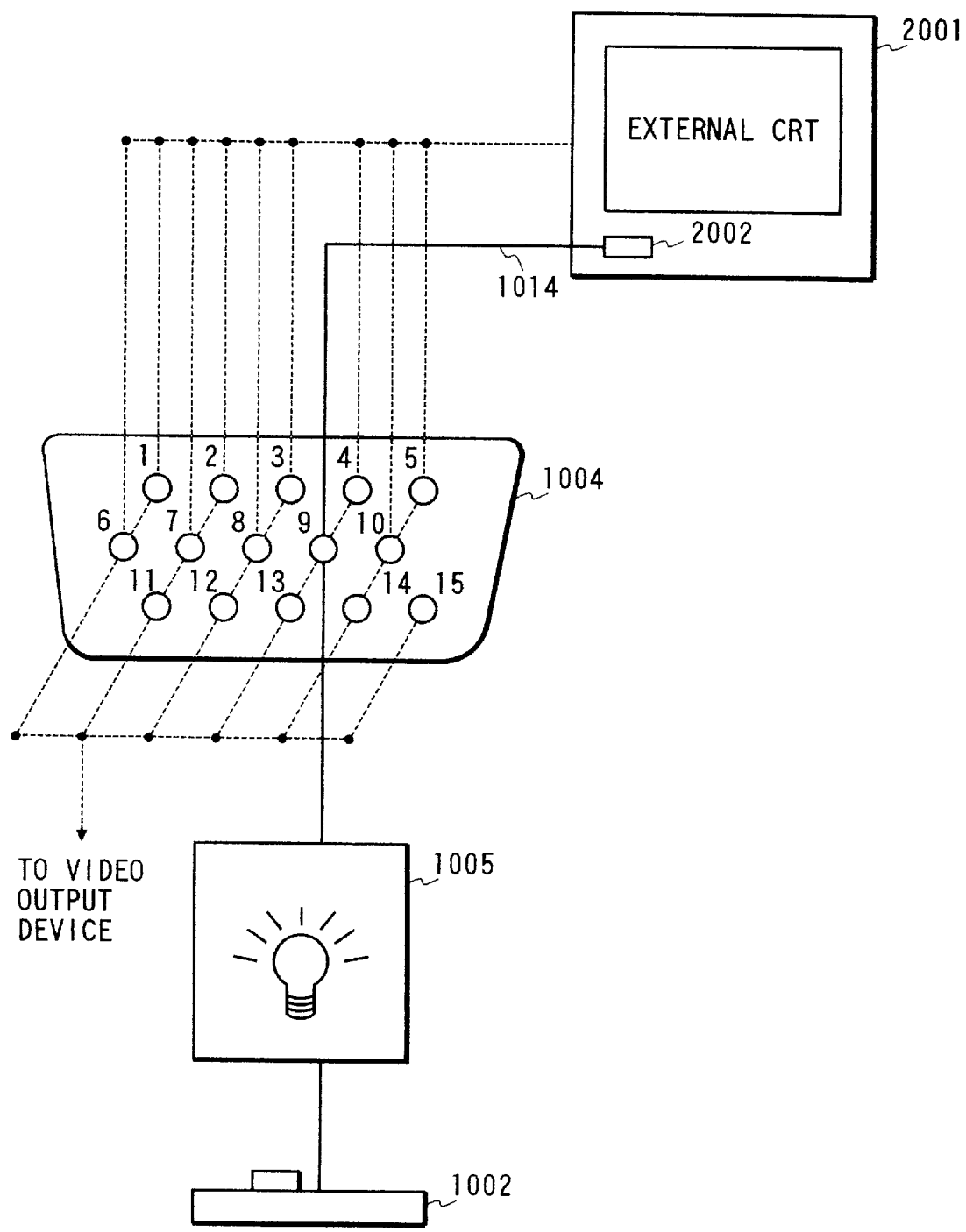
FIG. 7 is a block diagram showing the details of a feature unit of the information processing system of FIG. 6.

FIG. 6 is a block diagram showing a schematic construction of an information processing system according to the second embodiment of the invention. The information processing system has a personal computer having the power management function as an information processing system and peripheral devices such as CRT display, printer, and the like can be externally connected to the system in a manner similar to the first embodiment.

In the diagram, reference numeral 1001 denotes a power switch for controlling a supply of an electric power to the information processing system. Reference numeral 1002 denotes a resumption/suspension switch for controlling the shift of the operation state of the system between the resumption state and the suspension state and for controlling the supply of electric powers to the peripheral devices in each state. The resumption/suspension switch 1002 can be controlled by a resumption process detection control apparatus 1005.

Reference numeral 1003 denotes a battery for supplying an electric power to the information processing system; 1004 a CRT connector to which one end of a CRT cable 1014 for connecting the information processing system and the external CRT device is connected; and 1005 the resumption process detection control apparatus for detecting various resumption processing requests and controlling the start and execution of the resumption process.

Reference numeral 1006 denotes a memory for storing various information; 1007 a keyboard for inputting various information; 1008 a CPU (central processing unit) for controlling the operation of the information processing system; 1009 a hard disk; 1010 a floppy disk drive; and 1011 a video output device.

Reference numeral 1012 denotes a power source line for connecting the battery 1003 with the CRT connector 1004, resumption process detection control apparatus 1005, memory 1006, keyboard 1007, CPU 1008, hard disk 1009, floppy disk drive 1010, and video output device 1011. Reference numeral 1013 denotes control lines for mutually connecting the CRT connector 1004, resumption process detection control apparatus 1005, and resumption/suspension switch 1002. FIG. 7 is a diagram showing a feature portion of the information processing system in more detail.

In the diagram, reference numeral 2001 denotes an external CRT. The external CRT 2001 has the power management function for detecting that the information processing system has been shifted to the suspension state and for shifting the system to the suspension state. Reference numeral 2002 denotes a CRT switch provided for the external CRT 2001.

The CRT cable 1014 is constructed by 15 signal lines. The 15 signal lines are respectively connected to 15 connector pins of the CRT connector 1004.

A signal line of a Red signal is connected to the connector pin 1. A signal line of a Green signal is connected to the connector pin 2. A signal line of a Blue signal is connected to the connector pin 3. A Ground is connected to the connector pin 4. A Ground is connected to the connector pin 5. An R-Ground is connected to the connector pin 6. A G-Ground is connected to the connector pin 7. A B-Ground is connected to the connector pin 8. A signal line of a resumption request signal is connected to the connector pin 9. A Sync-Ground is connected to the connector pin 10. A Ground is connected to the connector pin 11. The connector pin 12 is set to No Connection. A signal line of an H-Sync signal is connected to the connector pin 13. A signal line of a V-Sync signal is connected to the connector pin 14. The connector pin 15 is set to No Connection.

The operation of the information processing system will now be described with reference to FIGS. 6 and 7.

When the power switch 1001 is turned on, the supply of electric powers from the battery 1003 to the CRT connector 1004, resumption process detection control apparatus 1005, memory 1006, keyboard 1007, CPU 1008, hard disk 1009, floppy disk drive 1010, and video output device 1011 through the power source line 1012 is started. The information processing system starts the operation.

The video output device 1011 generates a video signal to the external CRT 2001 through the CRT connector 1004 and CRT cable 1014. In this instance, when the power source of the external CRT 2001 is ON, the external CRT 2001 performs a drawing operation in accordance with the inputted video signal through the connector pins 1, 2, 3, 13, and 14 of the CRT connector 1004.

When interrupting the use of the information processing system and shifting the system to the suspension state, the user operates the resumption/suspension switch 1002. The resumption/suspension switch 1002 controls the power source line 1012 and stops the supply of the electric powers to the keyboard 1007, CPU 1008, hard disk 1009, floppy disk drive 1010, and video output device 1011. The information processing system is shifted to the suspension state. In this instance, the supply of the electric power to the resumption process detection control apparatus 1005 is continued.

When the information processing system enters the suspension state, the video output device 1011 stops all of the outputs of the video signal to the outside. The external CRT 2001 detects that the input of the video signal from the information processing system has been stopped. When this state continues for a predetermined time, it is judged that the information processing system main body is in the suspension state, so that the system is shifted to the suspension state.

Subsequently, in case of again using the information processing system in the suspension state, the user operates the resumption/suspension switch 1002 or operates the CRT switch 2002 of the external CRT 2001. When the CRT switch 2002 is operated, the external CRT 2001 is resumed and transmits a resumption request signal to the information processing system through a signal line 9 of the CRT cable 1014.

When the information processing system receives the resumption request signal from the external CRT 2001, the resumption process detection control apparatus 1005 detects that the resumption request signal was inputted, controls the resumption/suspension switch 1002, and starts the resumption process of the information processing system.

The resumption/suspension switch 1002 controls the power source line 1012 and restarts the supply of the electric powers from the battery 1003 to the keyboard 1007, CPU 1008, hard disk 1009, floppy disk drive 1010, and video output terminal 1011.

As described in detail above, according to the information processing system of the embodiment, even when the information processing system is in the suspension state, the electric power is supplied to the resumption process detection control apparatus 1005. The resumption process detection control apparatus 1005 detects that the CRT switch 2002 of the external CRT 2001 has been operated, thereby starting the resuming operation. Therefore, the information processing system can be resumed without operating the resumption/suspension switch 1002 of the information processing system.

The third embodiment of the invention will now be described with reference to FIGS. 8 and 9.

Figure 8:
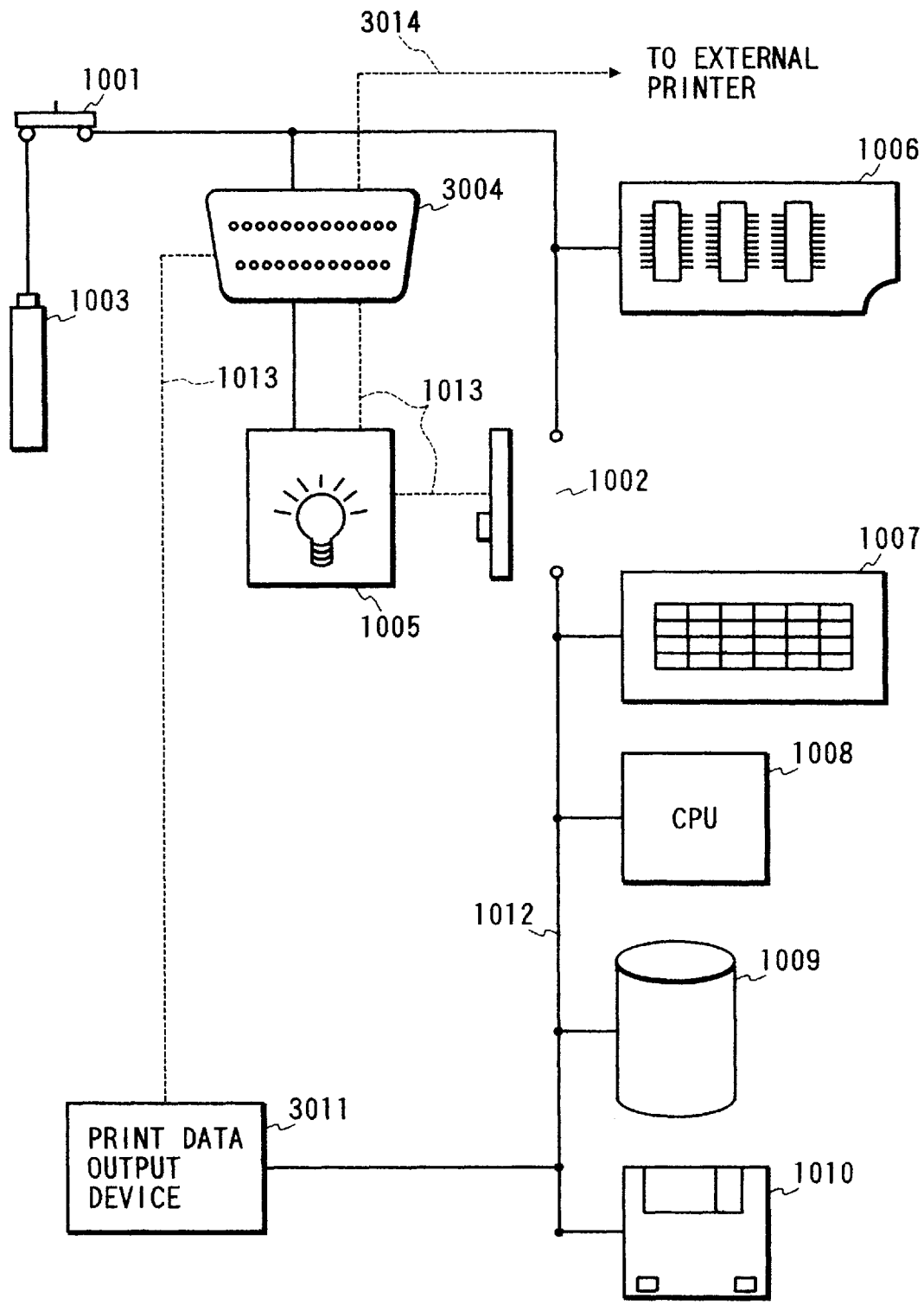
FIG. 8 is a block diagram showing a schematic construction of an information processing system according to the third embodiment of the invention.

FIG. 8 is a block diagram showing a schematic construction of an information processing system according to the third embodiment of the invention. As shown in the diagram, the information processing system of the embodiment differs from the information processing system of the second embodiment with respect to the following points. Namely, in place of the CRT connector 1004, a printer connector 3004 to connect a printer is provided. In place of the video output device 1011, a print data output device 3011 to output print data to the printer is provided. In place of the CRT cable 1014, a printer cable 3014 to connect the information processing system and the printer through the printer connector 3004 is provided.

Figure 9:
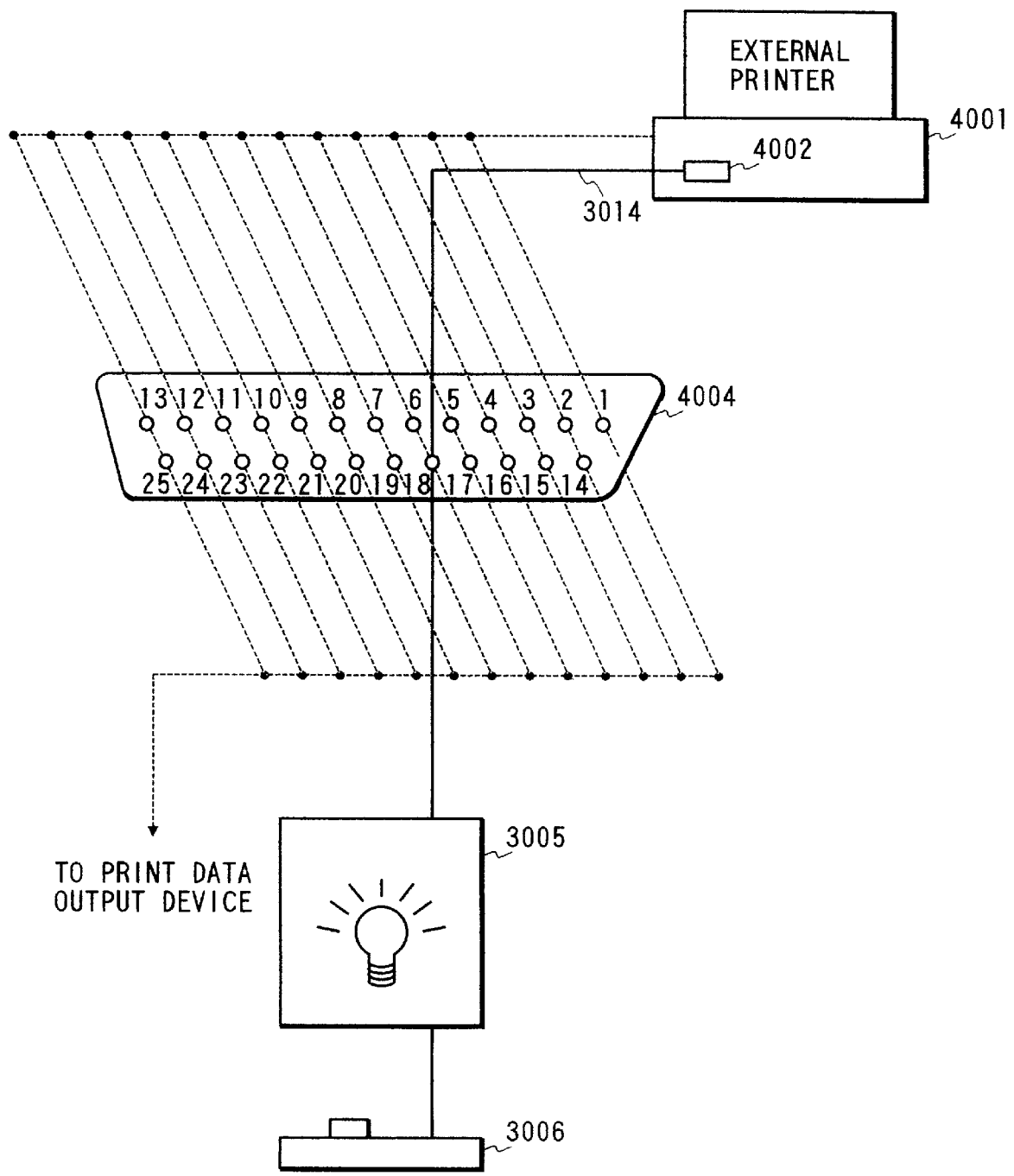
FIG. 9 is a block diagram showing the details of a feature unit of the information processing system of FIG. 8.

FIG. 9 is a diagram showing the details of a feature portion of the information processing system.

In the diagram, reference numeral 4001 denotes an external printer. The printer 4001 has the power management function for detecting that the information processing system has been shifted to the suspension state and shifting itself to the suspension state. Reference numeral 4002 denotes a printer switch provided for the printer 4001.

The printer cable 3014 is constructed by 25 signal lines. The signal lines are connected to 25 connector pins of the printer connector 3004, respectively.

A signal line of a strobe signal is connected to the connector pin 1. A signal line of a data 0 signal is connected to the connector pin 2. A signal line of a data 1 signal is connected to the connector pin 3. A signal line of a data 2 signal is connected to the connector pin 4. A signal line of a data 3 signal is connected to the connector pin 5. A signal line of a data 4 signal is connected to the connector pin 6. A signal line of a data 5 signal is connected to the connector pin 7. A signal line of a data 6 signal is connected to the connector pin 8. A signal line of a data 7 signal is connected to the connector pin 9.

A signal line of an AACKNLG signal is connected to the connector pin 10. A signal line of a BUSY signal is connected to the connector pin 11. A signal line of a paper end signal is connected to the connector pin 12. A signal line of a selection signal is connected to the connector pin 13. A signal line of an auto feed signal is connected to the connector pin 14. A signal line of an error signal is connected to the connector pin 15. A signal line of an INIT signal is connected to the connector pin 16. A signal line of an SLCTIN signal is connected to the connector pin 17. A signal line of a resumption request signal is connected to the connector pin 18.

The connector pins 19 to 25 are connected to the ground.

The operation of the information processing system will now be described with reference to FIGS. 8 and 9.

First, when the power switch 1001 is turned on, the supply of an electric power to each unit of the system is started and the information processing system starts the operation in a manner similar to the information processing system of the second embodiment.

When the print data output device 3011 generates print data to the printer 4001 through the printer connector 3004 and printer cable 3014, the printer 4001 starts the printing in accordance with the print data received.

In case of interrupting the use of the information processing system and shifting the system to the suspension state, the user operates the resumption/suspension switch 1002. When the resumption/suspension switch 1002 is operated, the information processing system executes processes similar to those in the second embodiment and is set into the suspension state. In this instance, the supply of the electric power to the resumption process detection control apparatus 1005 is continued.

When the information processing system enters the suspension state, the information processing system stops all of the outputs of the print data to the outside. When no print data is inputted for a predetermined time, the printer 4001 judges that the information processing system main body is in the suspension state, thereby shifting to the suspension state.

Subsequently, in case of again using the information processing system in the suspension state, the user operates the resumption/suspension switch 1002 or operates the printer switch 4002 of the printer 4001. When the printer switch 4002 is operated, the printer 4001 is resumed and transmits a resumption request signal to the information processing system through a signal line 18 of the printer cable 3014.

When the information processing system receives the resumption request signal from the printer 4001, the resumption process detection control apparatus 1005 detects that the resumption request signal has been inputted, thereby starting the resumption process of the information processing system by executing processes similar to those in the second embodiment.

As described in detail above, according to the information processing system of the embodiment, even when the information processing system is in the suspension state, the electric power is supplied to the resumption process detection control apparatus 1005. The resumption process detection control apparatus 1005 detects that the printer switch 4002 of the printer 4001 has been operated, thereby resuming the information processing system. Therefore, the information processing system can be resumed without operating the resumption/suspension switch 1002 of the information processing system.

The fourth embodiment of the invention will now be described with reference to FIGS. 10 to 13.

Figure 10:
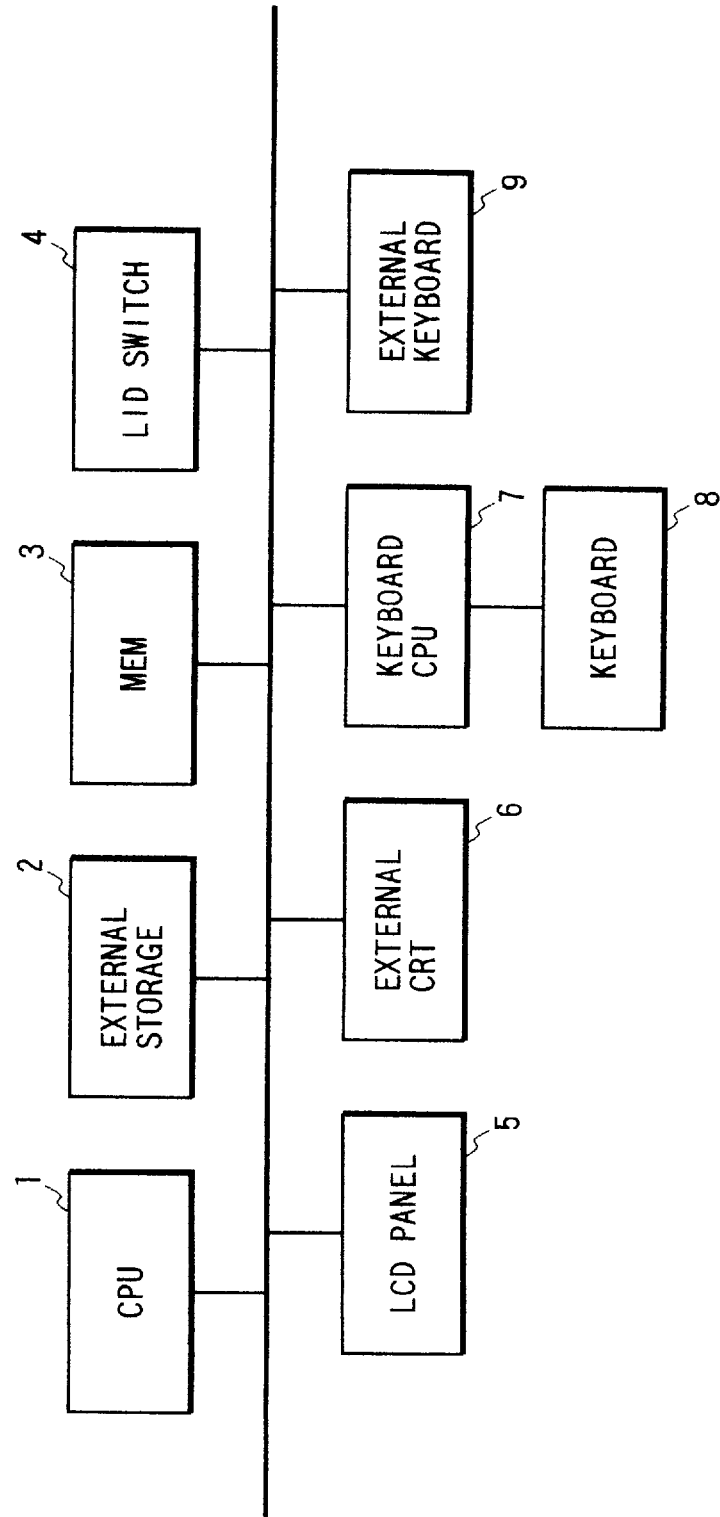
FIG. 10 is a block diagram showing a schematic construction of an information processing system according to the fourth embodiment of the invention.

FIG. 10 is a block diagram showing a schematic construction of an information processing system according to the fourth embodiment of the invention.

The information processing system of the embodiment has an information processing system having a lid such as what is called a notebook type personal computer or the like and can set a suspension environment of either one of "a suspension is performed" and "no suspension is performed". The information processing system is constructed by a CPU 1; an external storage 2; a memory 3; an LID switch 4; an LCD (liquid crystal display) panel 5; a keyboard CPU 7; a keyboard 8; and the like. An external CRT 6 and an external keyboard 9 can be also connected to the information processing system.

The CPU 1 controls the entire information processing system. The external storage 2 stores a control program of the external CRT 6, a control program of various keyboards, a program when executing a suspension process and a resumption process, and the like. The various programs stored in the external storage 2 are loaded into the memory 3 as necessary. The LID switch 4 detects the opening or closure of the lid of the information processing system. When the closure of the lid is detected by the LID switch 4, an interruption of the hardware occurs and a program to perform the suspension process is activated.

The LCD panel 5 is a display device built in the information processing system. The external CRT 6 is a display device which is externally attached to the information processing system. The keyboard CPU 7 manages a state of the keyboard 8, a type and a connecting situation of the external keyboard 9, and the like under a communication with the CPU 1.

Figure 11:
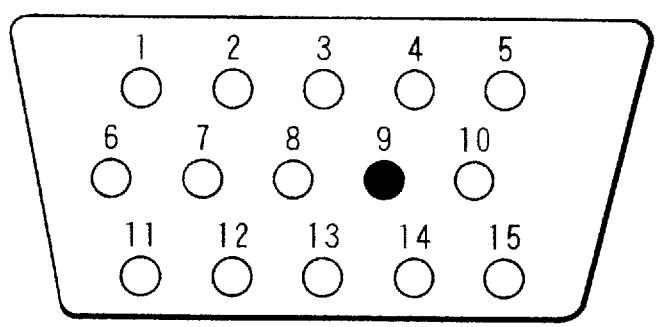
FIG. 11 is an explanatory diagram showing the details of a CRT connector of the information processing system of FIG. 10.

FIG. 11 is an explanatory diagram showing the details of a CRT connector of the information processing system to which the external CRT 6 is connected through the CRT cable.

The CRT cable which is connected to the CRT connector is constructed by 15 signal lines. The 15 signal lines are connected to 15 connector pins of the CRT connector similar to the CRT connector 1004 in the foregoing second embodiment, respectively.

In a manner similar to the second embodiment, a signal line of a Red signal is connected to the connector pin 1. A signal line of a Green signal is connected to the connector pin 2. A signal line of a Blue signal is connected to the connector pin 3. A Ground is connected to the connector pin 4. A Ground is connected to the connector pin 5. An R-Ground is connected to the connector pin 6. A G-Ground is connected to the connector pin 7. A B-Ground is connected to the connector pin 8. A Sync-Ground is connected to the connector pin 10. A Ground is connected to the connector pin 11. The connector pin 12 is set to No Connection. A signal line of an H-Sync signal is connected to the connector pin 13. A signal line of a V-Sync signal is connected to the connector pin 14. The connector pin 15 is set to No Connection. The embodiment differs from the second embodiment with respect to a point that a signal to confirm the connection of the external CRT 6 can be transferred through the signal line which is connected to the connector pin 9.

The operation of the information processing system will now be described with reference to FIGS. 12 and 13 together with FIGS. 10 and 11.

Figure 12:
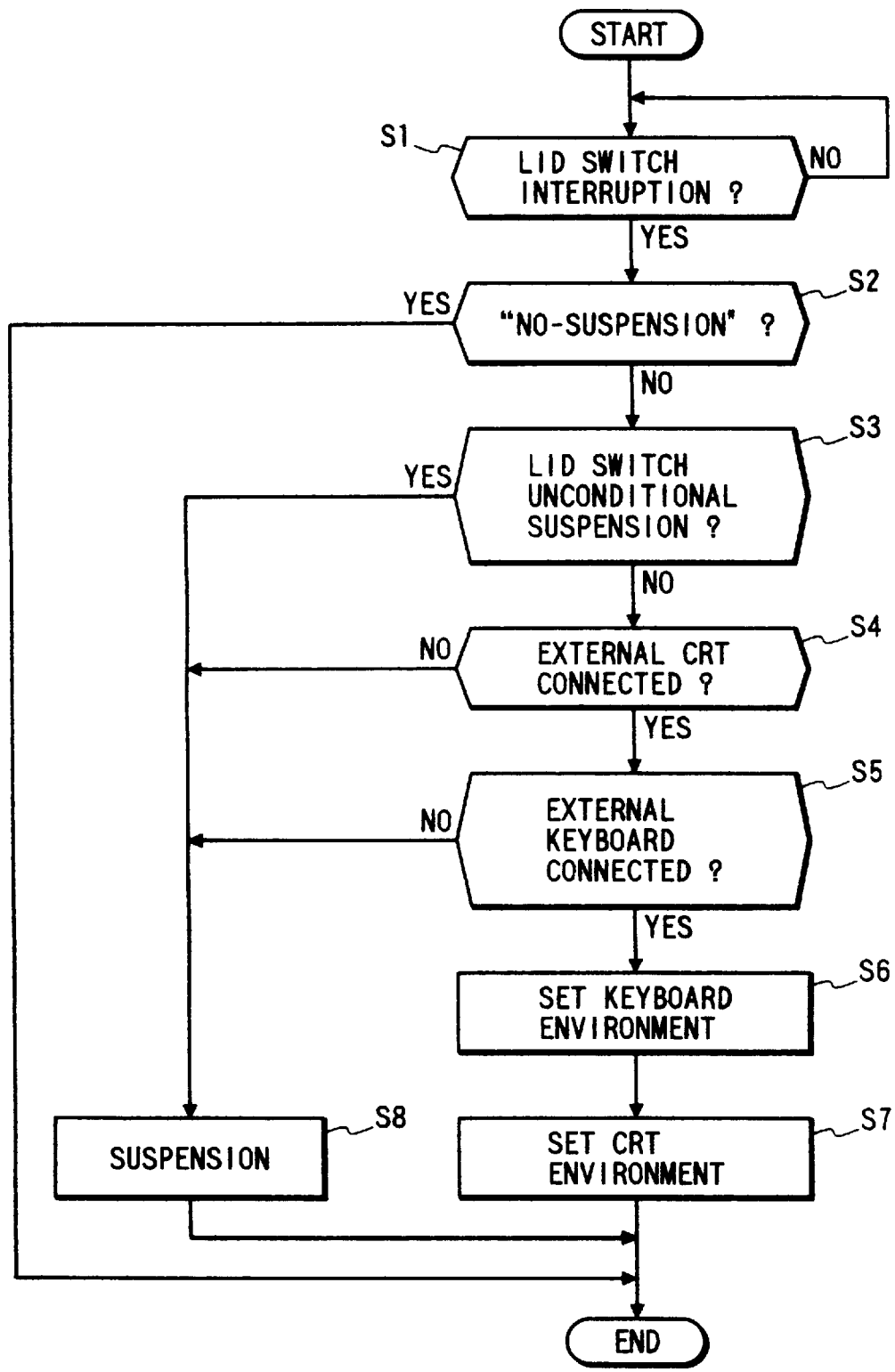
FIG. 12 is a flowchart showing the operation of the information processing system.

FIG. 12 is a flowchart showing processes in case of confirming the connection of the external CRT 6 through the signal line which is connected to the connector pin 9 of the CRT connector.

In step S1 in the flowchart, a check is made to see if the interruption of the LID switch has occurred due to the closure of the lid or not. When the interruption occurs, step S2 follows. The present suspension environment of the system which has been set in the memory 3 is discriminated. When the system has been set to the "no suspension is performed" environment, the processing routine is finished. When the system has been set to the "a suspension is performed" environment, step S3 follows. A check is made to see if the set suspension environment has been set to the environment such that the suspension process is unconditionally performed by the interruption from the LID switch. When the environment has been set to the environment such that the suspension process is unconditionally performed, step S8 follows. The present operation environment is saved to the disk in response to the interruption from the LID switch and the suspension process to stop the supply of the electric powers to the various devices such as a CPU and the like is executed. The processing routine is finished.

In step S3, when the set suspension environment is not set to the environment such that the suspension process is unconditionally performed by the interruption from the LID switch, step S4 follows. The connecting situation of the external CRT 6 is judged. The connecting situation of the external CRT 6 is judged by allocating the connector pin 9 of the CRT connector as an input port of the I/O port, performing the writing operation from the CRT side to the connector pin 9, and recognizing the writing operation by the CPU 1. In the embodiment, although the connector pin of the signal line to transmit the signal for confirming the connection has been set to the connector pin 9, in a manner similar to the connector pin 9, the connector pin 12 or 15 which is not ordinarily used can be also used as a signal line of the signal for confirming the connection.

When it is judged in step S4 that the external CRT is not connected, step S8 follows and the suspension process is executed. The processing routine is finished. When it is judged that the external CRT has been connected, step S5 follows. The connecting situation of the external keyboard is judged. The connecting situation of the external keyboard is judged by inquiring the connecting situation of the keyboard to the keyboard CPU 7 through the I/O port.

In step S5, when it is judged that the external keyboard is not connected, step S8 follows and the suspension process is executed. The processing routine is finished. When it is judged that the external keyboard is connected, step S6 follows and the environment setting process of the keyboard is performed.

In the environment setting process of the keyboard, the type of the connected external keyboard is inquired to the keyboard CPU 7. A program to control the keyboard connected is loaded from the external storage 2 as necessary, thereby making the connected keyboard normally operative.

When the environment setting process of the keyboard is finished in step S6, step S7 follows and the environment setting process of the CRT is executed.

In the environment setting process of the CRT, the program for controlling the CRT is loaded from the external memory 2 as necessary. The CRT is reset to a preset resolution. A destination to which the video signal is outputted is changed to the external CRT 6 from the built-in LCD panel 5.

Figure 13:
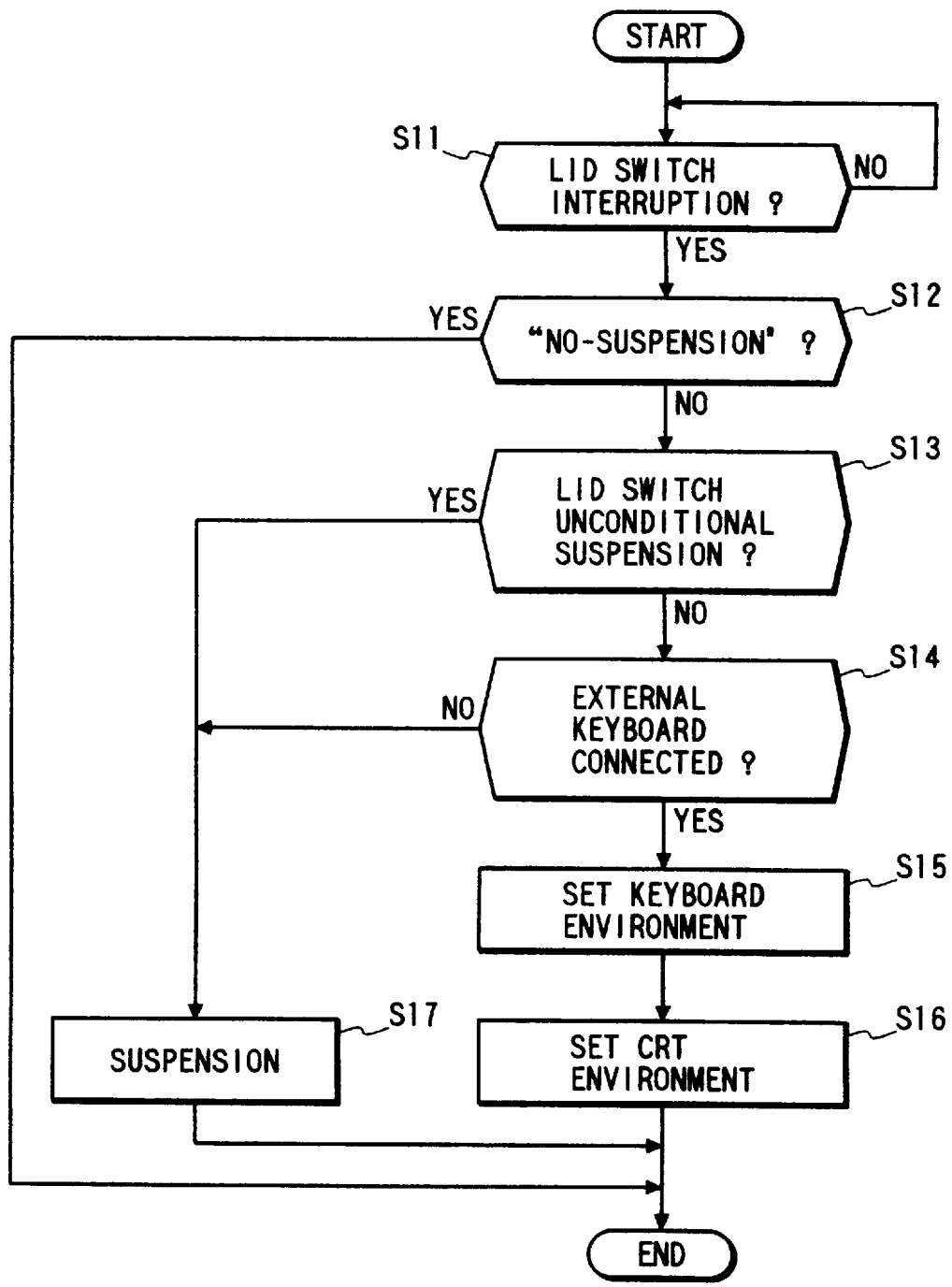
FIG. 13 is a flowchart showing the operation of the information processing system.

FIG. 13 is a flowchart showing processes in the case where it is assumed that the external CRT 6 is connected and the presence or absence of the connection is not confirmed. The processes of FIG. 13 differ from the processes of FIG. 12 with respect to only a point that the process to judge the presence or absence of the connection of the external CRT 6 in step S4 is omitted. Therefore, its detailed description is omitted.

According to the information processing system of the embodiment as described in detail above, even if the suspension environment is held in the "a suspension is performed" setting, when the connection of the peripheral device such as external CRT, external keyboard, or the like is detected, the suspension process is not executed even when the LID switch detects the closure of the lid. Therefore, there is no need to change the setting of the suspension environment in accordance with the connecting situation of the peripheral device.

According to the information processing system of the invention, the connecting situation of a predetermined peripheral device to the information processing system is detected by the connecting situation detecting means and the event for setting the predetermined peripheral device into the operation state is detected by the event detecting means. When the connection of the predetermined peripheral device is detected by the connecting situation detecting means, the mode of the suspension state is set into the mode in which the system can be resumed from the suspension state to the operation state when there is an input of the above event by the mode setting means. Therefore, in the case where the peripheral device which always has the necessity for resuming from the suspension state to the operation state is connected and used, the device can be always resumed to the operation state any time by the event input.

According to the information processing system of the invention, since the mode of the suspension state is constructed by the mode in which the predetermined peripheral device can be resumed to the operation state when the event is detected and the mode in which the predetermined peripheral device can be resumed to the operation state only by an artificial operation. Therefore, in the case where the peripheral device which always has the necessity to resume from the suspension state to the operation state is connected and used, the device can be resumed to the operation state any time by the event input.

According to the information processing system of the invention, when the operating situation of the switch of the peripheral device connected to the information processing system main body is detected by the detecting means and when the operation of the switch of the peripheral device is detected by the detecting means, the start of the resuming operation is instructed to the resuming means by the instructing means. Therefore, the switching operation of the peripheral device connected is detected and the information processing system can be resumed from the suspension state to the operation state.

According to the information processing system of the invention, the connecting situation of the peripheral device to the information processing system and the operating situation of the peripheral device connected are detected by the detecting means. The judging means judges whether the system should be shifted to the suspension state on the basis of the connecting situation and the operating situation of the peripheral device which were detected by the detecting means when the closure of the lid is detected by the switch or not. When the judging means judges that the system should not be shifted to the suspension state, the inhibiting means inhibits that the shifting means shifts the system to the suspension state. Therefore, the setting regarding whether the system is shifted to the suspension state when the lid of the information processing system is closed or not can be automatically switched in accordance with the connecting situation and the operating situation of the external module.

According to the information processing system of the invention, when the shift of the system to the suspension state by the shifting means is inhibited by the inhibiting means, the operation environment of the system is reset by the resetting means in correspondence to the peripheral device whose connection was detected by the detecting means. Therefore, the setting regarding whether the system is shifted to the suspension state when the lid of the information processing system is closed or not can be automatically switched in accordance with the connecting situation and the operating situation of the external module.

What is claimed is:

1. An information processing system including an information processing system main body and a peripheral device and having a power management function which includes a plurality of suspension modes, said system comprising:

connection state detecting means for detecting whether a predetermined peripheral device is connected to the information processing system main body or not;

event detecting means for detecting an event to instruct the start of one of the plurality of suspension modes; and mode setting means for setting said system into a mode from among the plurality of suspension modes in which said system can be resumed from a suspension state to an operational state when said event detecting means detects that an event is generated as a result of said connection state detecting means detecting that the predetermined peripheral device is connected.

2. A system according to claim 1, wherein the peripheral device is a modem.

3. A system according to claim 1, wherein the peripheral device is a card access device, and said connection state detecting means detects that a card has been inserted into the card access device.

4. A power management method for an information processing system including an information processing system main body and a peripheral device and having a power management function which includes a plurality of suspension modes, said method comprising the steps of:

detecting whether a predetermined peripheral device is connected to the information processing system main body or not;

detecting an event to instruct the start of one of the plurality of suspension modes; and setting a mode from among the plurality of suspension modes in which the system can be resumed from a suspension state to an operational state when it is detected in said event detecting step that an event is generated as a result of a detection in said connection state detecting step that the predetermined peripheral device is connected.

5. An information processing apparatus to which a plurality of types of peripheral devices can be connected, said apparatus comprising:

connection means for connecting a peripheral device to said information processing apparatus;

type setting means for setting at least one of the plurality of types of peripheral devices;

discrimination means for discriminating whether the peripheral device connected by said connection means is of a type included in the type set by said type setting means;

mode setting means for setting either a first suspend mode or a second suspend mode different from the first suspend mode;

instruction means for producing an instruction for starting a suspend mode; and control means for starting the first suspend mode in response to the instruction produced by said instruction means regardless of whether said mode setting means sets the first suspend mode or the second suspend mode, in the event that said discrimination means discriminates that the connected peripheral device has a type included in the type set by said type setting means.

6. An apparatus according to claim 5, wherein the first suspend mode is a mode resumable to an operational mode.

7. An apparatus according to claim 5, wherein the plurality of types of peripheral devices include a modem.

8. A method for an information processing apparatus to which a plurality of types of peripheral devices can be connected, comprising the steps of:

connecting a peripheral device to the information processing apparatus;

setting at least one of the plurality of types of peripheral devices;

discriminating whether the peripheral device connected in said connection step is of a type included in the type set in said type setting step;

setting either a first suspend mode or a second suspend mode different from the first suspend mode;

producing an instruction for starting a suspend mode; and starting the first suspend mode in response to the instruction produced in said instruction step regardless of whether the first suspend mode or the second suspend mode is set in said mode setting step, in the event that it is discriminated in said discrimination step that the connected peripheral device has a type included in the type set in said type setting step.

9. A method according to claim 8, wherein the first suspend mode is a mode resumable to an operational mode.

10. A method according to claim 8, wherein the plurality of types of peripheral devices include a modem.

11. A computer-useable medium storing computer-useable instructions for controlling an information processing apparatus to which a plurality of types of peripheral devices can be connected, said medium comprising:

instructions for connecting a peripheral device to the information processing apparatus;

instructions for setting at least one of the plurality of types of peripheral devices;

instructions for discriminating whether the peripheral device connected by said connection instructions is of a type included in the type set by said type setting instructions;

instructions for setting either a first suspend mode or a second suspend mode different from the first suspend mode;

instructions for producing an instruction for starting a suspend mode; and instructions for starting the first suspend mode in response to the instruction produced by said producing instructions regardless of whether said mode setting instructions set the first suspend mode or the second suspend mode, in the event that said discrimination instructions discriminate that the connected peripheral device has a type included in the type set by said type setting instructions.

12. A medium according to claim 11, wherein the first suspend mode is a mode resumable to an operational mode.

13. A medium according to claim 11, wherein the plurality of types of peripheral devices include a modem.

14. A computer-useable medium storing computer-useable instructions for controlling an information processing system including an information processing system main body, a peripheral device and having a power management function which includes a plurality of suspension modes, said medium comprising:

instructions for detecting whether a predetermined peripheral device is connected to the information processing system main body or not;

instructions for detecting an event to instruct the start of one of the plurality of suspension modes; and instructions for setting the system into a mode from among the plurality of suspension modes in which the system can be resumed from a suspension state to an operational state when said event detecting instructions detect that an event is generated as a result of said connection state detecting instructions detecting that the predetermined peripheral device is connected.

\* \* \* \* \*

UNITED STATES PATENT AND TRADEMARK OFFICE
CERTIFICATE OF CORRECTION

PATENT NO.   : 5,845,137
DATED        : December 1, 1998
INVENTOR(S)  : Nobuyoshi Tanaka et al.

It is certified that error appears in the above-identified patent and that said Letters Patent is hereby corrected as shown below:

<u>Title page,</u>

Item [75] Inventor insert: -- HIDEYUKI KOBAYASHI, Tokyo, Japan, and TAKAHIRO ONSEN, Yokohama-shi, Japan--.

Signed and Sealed this

Seventh Day of August, 2001

*Attest:*

*Attesting Officer*

NICHOLAS P. GODICI
*Acting Director of the United States Patent and Trademark Office*